C. E. GIBSON.
AUTOMOBILE.
APPLICATION FILED APR. 16, 1910. RENEWED JULY 29, 1914.
1,111,018.
Patented Sept. 22, 1914.
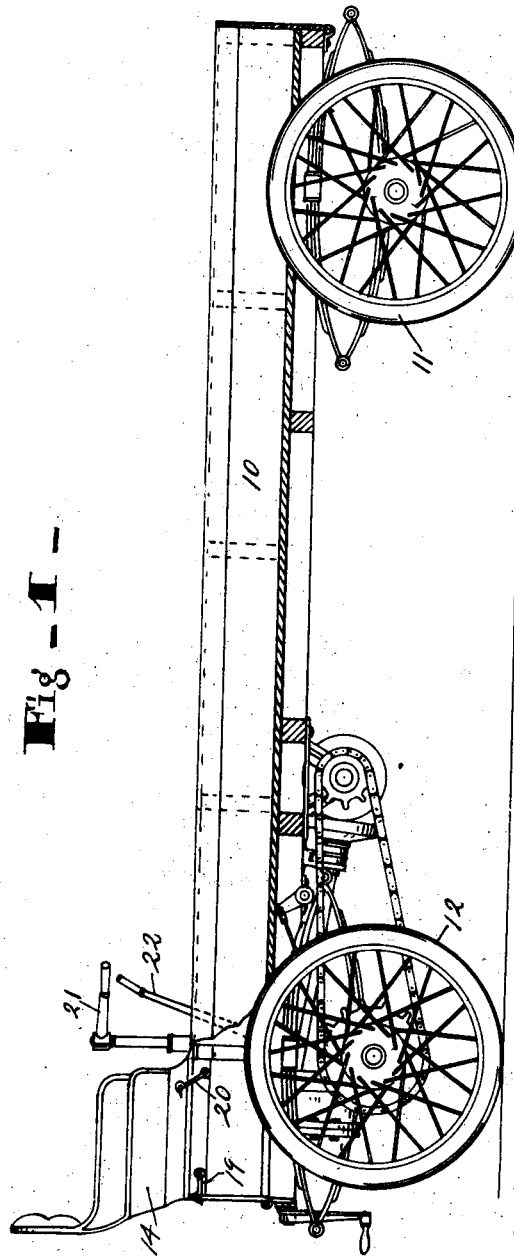
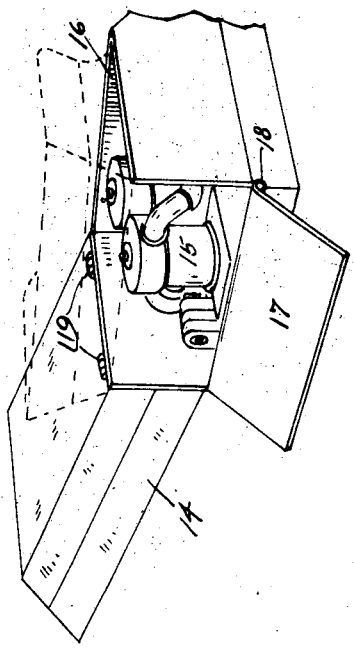
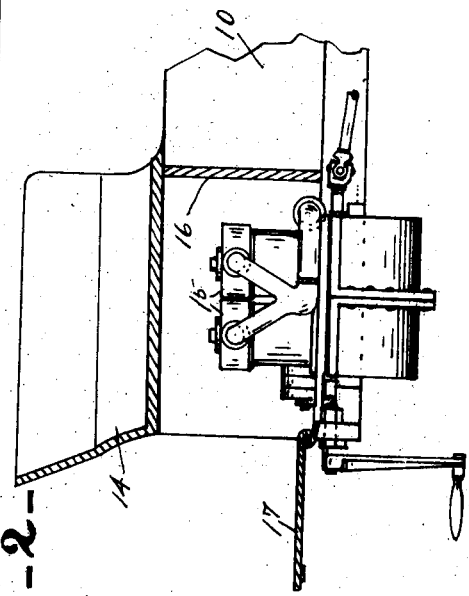
WITNESSES:
W. M. Gentle.
O. M. McLaughlin
INVENTOR.
Cecil E. Gibson
BY
ATTORNEY.

UNITED STATES PATENT OFFICE.

CECIL E. GIBSON, OF INDIANAPOLIS, INDIANA.

AUTOMOBILE.

1,111,018.  Specification of Letters Patent.  Patented Sept. 22, 1914.

Application filed April 16, 1910, Serial No. 555,866. Renewed July 29, 1914. Serial No. 853,972.

*To all whom it may concern:*

Be it known that I, CECIL E. GIBSON, of Indianapolis, county of Marion, and State of Indiana, have invented a certain new and useful Automobile; and I do hereby declare that the following is a full, clear, and exact description thereof, reference being had to the accompanying drawings.

The object of this invention is to improve the construction of commercial or delivery automobiles so as to render them more convenient to use and operate in cities.

One feature of the invention consists in placing the engine and seat at the rear end, of the body or bed so that the vehicle will be practically all in front of the driver and he can see better how to operate it in a city crowded with vehicles and while turning corners of streets and alleys, and avoid collisions. This is peculiarly desirable with commercial automobiles having long bodies or beds. It is often necessary that the body or bed be long to enable it to carry certain kinds of merchandise. Another advantage from this arrangement is that the bed may be free for the reception of merchandise from the extreme forward end back to the seat at the extreme rearward end. It is free from a dash near the seat or driving mechanism, or other means which would interfere with its use for receiving and holding merchandise. Along with the foregoing is the further idea of mounting the seat over the engine, and both the seat and engine over or slightly above and to the rear of the rear axle. This puts all four of the wheels in view of the driver.

Another feature of the invention consists in hinging the seat at one end and detachably fastening it at the other end, so that it may be lifted and turned up by the driver while in the vehicle to render the engine accessible. Also, the engine is placed at the extreme rear end of the body, and a hinged end-gate is provided so that it can be readily turned down by a person standing behind the vehicle to render the engine accessible to a person so situated. All these features have for their aim and object the improvement of commercial automobiles along practical lines so as to render the same as commercially useful as possible.

The nature of the invention will be understood from the accompanying drawings and the following description and claims.

In the drawings, Figure 1 is a side eleva- tion of the automobile with the body or bed in central vertical longitudinal section, from the front back almost to the seat at the rear end. Fig. 2 is a central vertical section of the rear end on a somewhat larger scale and with the end-gate turned down to render the engine accessible. Fig. 3 is a perspective view of the rear end of the body showing the box containing the engine with the seat turned up out of the way and the end-gate turned down to render the engine accessible, the normal position of the seat being indicated by dotted lines.

There is shown in the drawings an automobile body or bed 10 carried by front wheels 11 near the front end, and rear wheels 12 near the rear end. The bed is relatively very long to adapt it for use in carrying all merchandise and it is entirely free from anything in it to interfere with receiving merchandise from the extreme front end back to the seat 14.

The seat 14 is located at the extreme rear end of the body or bed over the engine 15 and above the rear axle. A wall 16 is secured in front of the engine beneath the front edge of the seat. A gate 17 is at the extreme rear end of the engine portion of the body, it being hinged at 18 at its lower end to the body and folds up against the ends of the side boards of the body and at its upper end is detachably connected by fasteners 19 with the body or bed of the vehicle. This renders the end-gate readily operable by one standing behind the vehicle, so that it may be opened and the engine made accessible to a person standing on the street. The seat 14 is hinged at one end by the hinges 119 at one side of the body or bed of the vehicle, so that it may be turned up to one side by a person standing in the bed of the vehicle and thus the engine be rendered accessible to him. When turned down its free end is detachably fastened to the body or bed by the fastener 20. The operating levers 21 and 22 are located near the rear end of the vehicle and outside the body or bed thereof so that the bed is free from the seat to the extreme forward end. Any suitable power transmitting and driving means may be employed as that is immaterial so far as this invention is concerned.

From the foregoing explanation and illustration in Fig. 1, it is obvious that the driver has full view of the wheels of the vehicle and the body or bed and the contents thereof, the same being always in front of him. He is, therefore, enabled to see how to guide his automobile to avoid collision with either stationary objects or the other vehicles, which is a matter of very serious importance in operating commercial automobiles in the cities. By placing the seat over the engine and both at the extreme rear end of the bed and over the rear axle, said parts of the automobile are made compact and limited to the extreme end of the body, and the body is left free from the seat to the forward end for merchandise, and the driver sits with his feet in the compartment occupied by the merchandise, so that he can reach by get up and walk to any part of the bed for handling the merchandise. Also, the engine is rendered readily accessible to him by the front seat being over the engine, and at the same time the engine is accessible to one standing at the rear of the automobile.

What I claim as my invention and desire to secure by Letters Patent is:

1. An automobile including a vehicle body open from end to end for the receipt of merchandise or the like, front and rear wheels and axles for supporting said vehicle body, an engine at the extreme rear end of the automobile body and substantially over the rear axle, a driver's seat located over the engine and opening into the bed, and means near the seat for controlling the engine and the direction of the automobile.

2. An automobile including a bed adapted to receive merchandise, an engine at the rear end of said bed for driving the automobile, a driver's seat located over the engine and opening into the bed, and means for operating and controlling the automobile which are located outside the bed, whereby the bed will be free from the seat to the front end for the receipt of merchandise.

In witness whereof, I have hereunto affixed my signature in the presence of the witnesses herein named.

CECIL E. GIBSON

Witnesses:
G. H. BOINK,
O. M. McLAUGHLIN.